W. S. AUSTIN.
NURLING TOOL.
APPLICATION FILED AUG. 26, 1919.
1,349,254.
Patented Aug. 10, 1920.
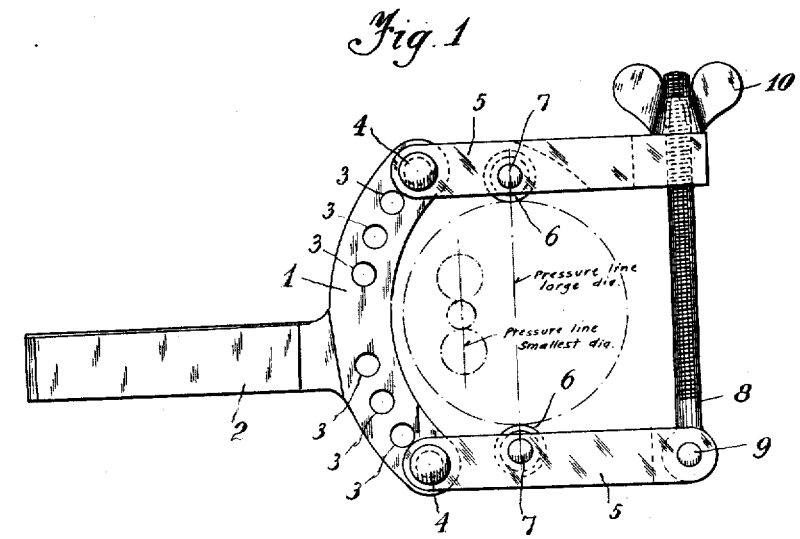
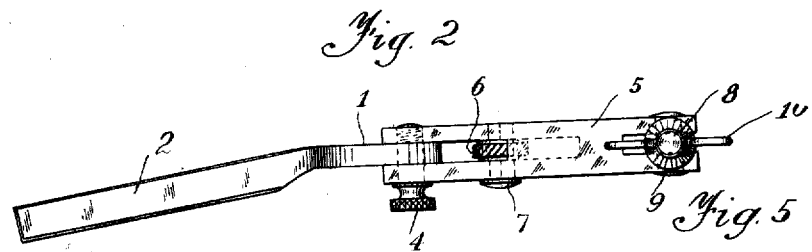
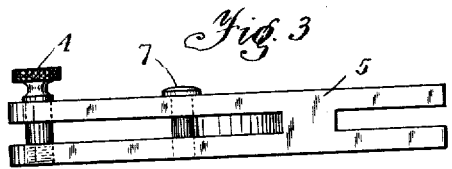
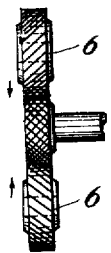
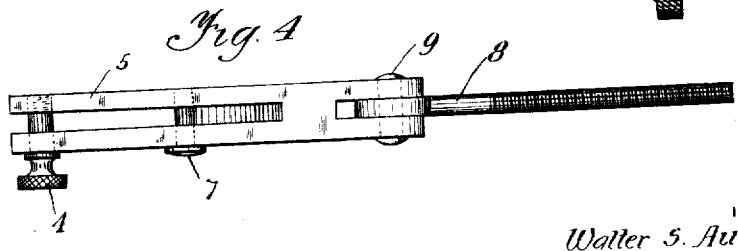
INVENTOR.
Walter S. Austin
by Ralph Donath
his Attorney

UNITED STATES PATENT OFFICE.

WALTER S. AUSTIN, OF PITTSBURGH, PENNSYLVANIA.

NURLING-TOOL.

1,349,254. Specification of Letters Patent. Patented Aug. 10, 1920.

Application filed August 26, 1919. Serial No. 319,868.

*To all whom it may concern:*

Be it known that I, WALTER S. AUSTIN, citizen of the United States, residing at Pittsburgh, in the county of Allegheny and State of Pennsylvania, have invented certain new and useful Improvements in Nurling-Tools, of which the following is a specification.

This invention relates to metal working tools, and more particularly to a nurling tool.

One of the main objects of the invention is to provide a tool of the character stated in which the nurling elements are so related as to avoid bending or distortion of the work, while relieving the lathe head and tool holder of all unnecessary strain; a further object is to provide a tool having an angularly disposed shank so as to permit the tool to be set close to the lathe chuck or a shoulder. Further objects will appear from the detailed description.

In the drawings:—

Figure 1 is a side view of the tool.
Fig. 2 is a top plan view.
Fig. 3 is a detail of the upper link.
Fig. 4 is a detail of the lower link.
Fig. 5 is a detail showing the relation of the nurls to the work when the tool is in use.

The tool is provided with an arcuate head 1 having an integral shank 2 adapted to be secured in a tool holder in the known manner, this shank being off-set, relative to the head, to permit the head to be set close to the lathe chuck or work holder. The head 1 is of regular curvature and is provided, through each arm, with a plurality of holes 3, adapted to receive pivot screws 4, by means of which nurl holding links 5 are secured to the head. The holes 3 permit ready adjustment of the links toward and away from each other, as will be understood.

The inner end portion of each link is longitudinally slotted to receive the arm of the head and to accommodate a knurl 6 rotatable upon a supporting pin 7 secured through the link. Each link has its outer end portion longitudinally slotted, also, and an eye-bolt 8 has its head pivotally secured by a pin 9 in the lower link, this bolt being adapted to be turned into position to extend through the outer slotted end of the upper link. A wing nut 10 is screwed upon this bolt above the upper link and serves to force the two links toward each other and to secure them against spreading apart.

As will be noted more clearly from Figs. 1 and 5, the nurls and the links are so related that, when the nurls are in operative engagement with the work, they are positioned diametrically opposite on the work, which is thus subjected to equal pressure from opposite directions. This effectually eliminates all danger of distortion of the work, such as frequently occurs when nurling in the usual manner in which the work is subjected to great pressure from one point only, and also the great strain to which the tool holder and lathe head, as well as the tool itself, are subjected in using the nurling tool commonly in practice.

The tool constructed in this manner possesses the requisite strength and rigidity and, by having the nurls pressing in opposite directions upon the work, insures more accurate and quicker nurling.

When desired, this tool, may be readily assembled or disassembled for repairing, cleaning or other purposes. Also by positioning the nurls at diametrically opposite points of the work, when in use, it may be subjected to great pressure for obtaining deep nurling without fear of bending or distorting the work.

It may be found, by experience, desirable to resort to slight modifications in the details of the tool and I do not, therefore, desire to be limited to the specific construction herein disclosed, except in so far as I may be so limited by the appended claims.

What I claim is:—

1. In a tool of the character stated, a head, nurl holding members pivoted at their inner ends to the head adjacent the opposite ends thereof, opposed nurls carried by said members, and means for securing the outer ends of the nurl-holding members together.

2. In a tool of the character stated, a head having oppositely directed arms, nurl holding members pivotally and adjustably secured at their inner ends to said head at opposite sides of the longitudinal center thereof, opposed nurls carried by said members, and means for adjustably securing the outer ends of the nurl-holding members together.

3. In a tool of the character stated, an elongated head, provided adjacent each end with a series of openings, nurl holding members, nurls carried thereby, pivot screws inserted through the inner ends of said members and insertible through one of said openings selectively, a securing member secured to the outer end of one of the nurl holding members and movable into engagement with the outer end of the other member, and means associated with said securing member for forcing the outer ends of the nurl-holding members toward each other.

4. In a tool of the character stated, an arcuate, head, nurl holding members pivoted to said head at their inner ends and spaced longitudinally of the head, one of said members having its outer end portion slotted, an eye bolt pivoted to the outer end of the other member and movable into the slot of the first mentioned member, a wing nut secured on said bolt for forcing the nurl-holding members toward each other, and opposed nurls carried by said members and disposed substantially 180° apart.

In testimony whereof I affix my signature.

WALTER S. AUSTIN.